(12) United States Patent
Krishnamoorthy et al.

(10) Patent No.: US 11,451,448 B1
(45) Date of Patent: Sep. 20, 2022

(54) SYSTEM FOR COGNITIVE TECHNICAL ARCHITECTURE INTEGRATION

(71) Applicant: BANK OF AMERICA CORPORATION, Charlotte, NC (US)

(72) Inventors: Madhusudhanan Krishnamoorthy, Srivilliputtur (IN); Clara Paul, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/342,660

(22) Filed: Jun. 9, 2021

(51) Int. Cl.
```
H04L 41/12      (2022.01)
H04L 41/14      (2022.01)
G06K 9/62       (2022.01)
H04L 41/0893    (2022.01)
H04L 41/16      (2022.01)
```

(52) U.S. Cl.
CPC .......... *H04L 41/12* (2013.01); *G06K 9/6215* (2013.01); *H04L 41/0893* (2013.01); *H04L 41/145* (2013.01); *H04L 41/16* (2013.01)

(58) Field of Classification Search
CPC ....... H04L 41/12; H04L 41/145; H04L 41/16; G06K 9/6215
See application file for complete search history.

(56) References Cited

U.S. PATENT DOCUMENTS

| | | |
|---|---|---|
| 6,115,646 A | 9/2000 | Fiszman et al. |
| 6,697,784 B2 | 2/2004 | Bacon et al. |
| 6,954,747 B1 | 10/2005 | Wang et al. |
| 7,062,537 B2 | 6/2006 | Aziz et al. |
| 7,065,493 B1 | 6/2006 | Homsi |
| 7,631,291 B2 | 12/2009 | Shukla et al. |
| 7,885,840 B2 | 2/2011 | Sadiq et al. |
| 7,983,943 B2 | 7/2011 | Morales et al. |
| 8,103,536 B2 | 1/2012 | Green et al. |

(Continued)

OTHER PUBLICATIONS

A Bayesian Approach to Diagram Matching with Application to Architectural Models (2006) by D Mandelin, D Kimelman, D Yellin in Proceedings of the 28th International Conference on Software Engineering (ICSE'06) (Year: 2006).*

(Continued)

*Primary Examiner* — David R Lazaro
(74) *Attorney, Agent, or Firm* — Moore & Van Allen PLLC; Gabrielle M. Carlin

(57) ABSTRACT

Embodiments of the invention are directed to systems, methods, and computer program products for integration of multiple technical architecture diagrams into a single diagram. Architectural diagrams are commonly used in program level impact analysis and may depict relationships, constraints, and boundaries between components of an individual software program as well as the relationships between multiple software programs, hardware components, and users. The present invention automatically identifies touchpoints, or connections between multiple architecture diagrams and applies a series of image-processing algorithms, generating a single integrated diagram for organizational use. Embodiments of the invention also provide for multiple rounds of image processing, allowing multiple integrated diagrams to be combined into single diagrams.

9 Claims, 5 Drawing Sheets

---

RECEIVE, FROM MANAGING ENTITY SYSTEM 130, A PRIMARY ARCHITECTURE 310 AND ONE OR MORE SECONDARY ARCHITECTURE(S) 311
600

↓

GENERATE INTEGRATED ARCHITECTURE 511
610

↓

TRANSMIT INTEGRATED ARCHITECTURE 511 TO MANAGING ENTITY SYSTEM 130 AND/OR ARCHITECTURE REPOSITORY 140
620

(56) References Cited

U.S. PATENT DOCUMENTS

| | | | |
|---|---|---|---|
| 8,170,901 | B2 | 5/2012 | Shukla et al. |
| 8,522,217 | B2 * | 8/2013 | Dutta .................. G06F 11/3612 |
| | | | 717/133 |
| 8,607,147 | B2 | 12/2013 | Dames et al. |
| 9,348,564 | B2 | 5/2016 | Keller |
| 9,395,959 | B2 | 7/2016 | Hatfield et al. |
| 9,934,026 | B2 | 4/2018 | Hansen et al. |
| 10,331,426 | B1 * | 6/2019 | Jarvis .................... G06F 40/143 |
| 10,552,423 | B2 | 2/2020 | Franke |
| 10,685,030 | B2 | 6/2020 | Brainerd et al. |
| 10,713,608 | B2 | 7/2020 | Goja |
| 11,237,802 | B1 * | 2/2022 | Krishnamoorthy .... G06N 20/00 |
| 2002/0161859 | A1 | 10/2002 | Willcox et al. |
| 2003/0200527 | A1 | 10/2003 | Lynn et al. |
| 2010/0106547 | A1 | 4/2010 | Adi et al. |
| 2011/0258611 | A1 * | 10/2011 | Dutta .................. G06F 11/3612 |
| | | | 717/127 |
| 2019/0386897 | A1 * | 12/2019 | Gun .......................... G06F 8/10 |
| 2020/0042519 | A1 | 2/2020 | Tomlin |
| 2021/0390656 | A1 * | 12/2021 | Krishnamoorthy ..... G06F 40/56 |
| 2022/0019413 | A1 * | 1/2022 | Krishnamoorthy ....... G06F 8/36 |

OTHER PUBLICATIONS

Madmatch: Many-to-many approximate diagram matching for design comparison by S Kpodjedo,F Ricca,P Galinier,G Antoniol,Y-G Gueheneuc , 2011 (Year: 2011).*

Differencing and merging of architectural views by Marwan Abi-Antoun,Jonathan Aldrich,Nagi H Nahas,Bradley R Schmerl,David Garlan—Autom. Softw. Eng (Year: 2005).*

* cited by examiner

SYSTEM FOR COGNITIVE TECHNICAL ARCHITECTURE INTEGRATION

BACKGROUND

Implementation of computer systems generally requires the use of architecture diagrams, which illustrate various components in the system as well as the interconnections or relationships between the components. For large and/or complex computer systems, multiple architecture diagrams are typically utilized, resulting in a significant effort required to complete a program level impact analysis and increasing the possibility of an implementation error occurring. As such, a need exists for a system which is able to automatically integrate multiple architectural diagrams into one diagram for organizational use.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for technical architecture integration, the invention including: receiving, from a managing entity system, a primary architecture diagram and at least one secondary architecture diagram; identifying a set of primary nodes from the primary architecture diagram and a set of secondary nodes from each of the at least one secondary architecture diagrams; determining, based on an image feature mapping routine, a set of touchpoints, where each touchpoint is a node occurring in both the set of primary nodes and the set of secondary nodes; and generating an integrated architecture diagram, where the integrated architecture diagram includes the set of touchpoints, the set of primary nodes which are not touchpoints, and the set of secondary nodes which are not touchpoints.

In some embodiments, the invention further includes determining, based on a regression algorithm, a first location of each touchpoint in the primary architecture diagram, where each first location is represented by a coordinate pair and determining, based on a regression algorithm, a second location of each touchpoint in the at least one secondary architecture diagram, where each second location is represented by a coordinate pair.

In some embodiments, the invention further includes extracting, at each of the first locations, a located primary node and extract, at each of the second locations, a located secondary node; calculating, for each of the located primary nodes, a level of similarity of the located primary node to each of the located secondary nodes; and determining, for each of the located primary nodes, a matching node, where each of the matching nodes is the located secondary node with which the located primary node has the highest level of similarity.

In some embodiments, calculating, for each of the located primary nodes, a level of similarity further includes evaluating a geometrical shape and a functional meaning for the located primary node and each of the located secondary nodes.

In some embodiments, generating the integrated architecture diagram further includes merging, based on a concatenation algorithm, each of the located primary nodes with each of the matching nodes.

In some embodiments, merging, based on a concatenation algorithm, each of the located primary nodes with each of the matching nodes further includes introducing a level of random noise into the concatenation algorithm.

In some embodiments, the invention further includes calculating an overall efficiency score of the system and transmitting the overall efficiency score to the managing entity system.

In some embodiments, the invention further includes transmitting the integrated architecture diagram to the managing entity system and storing the integrated architecture diagram in a remote database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
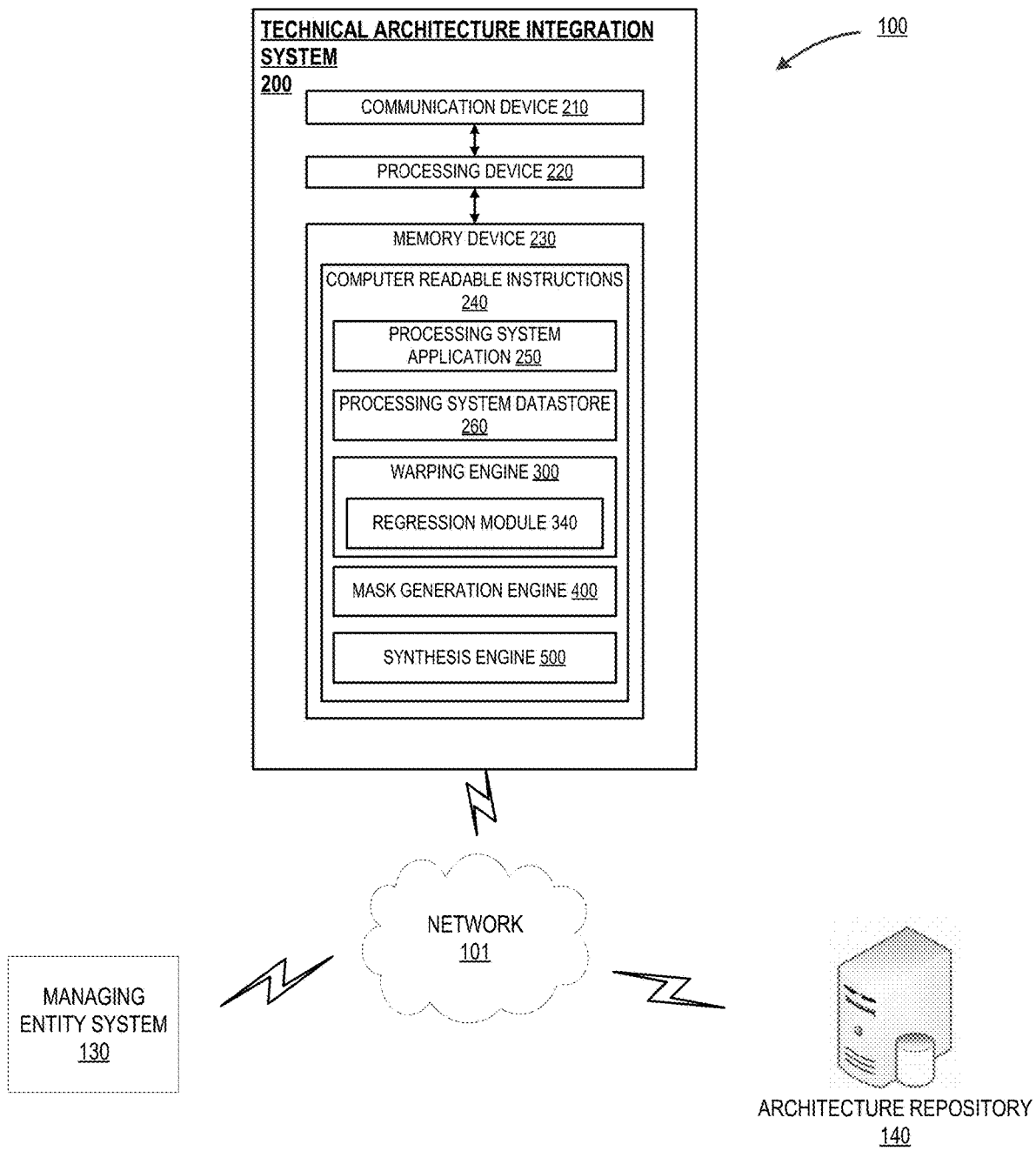
Figure 2:
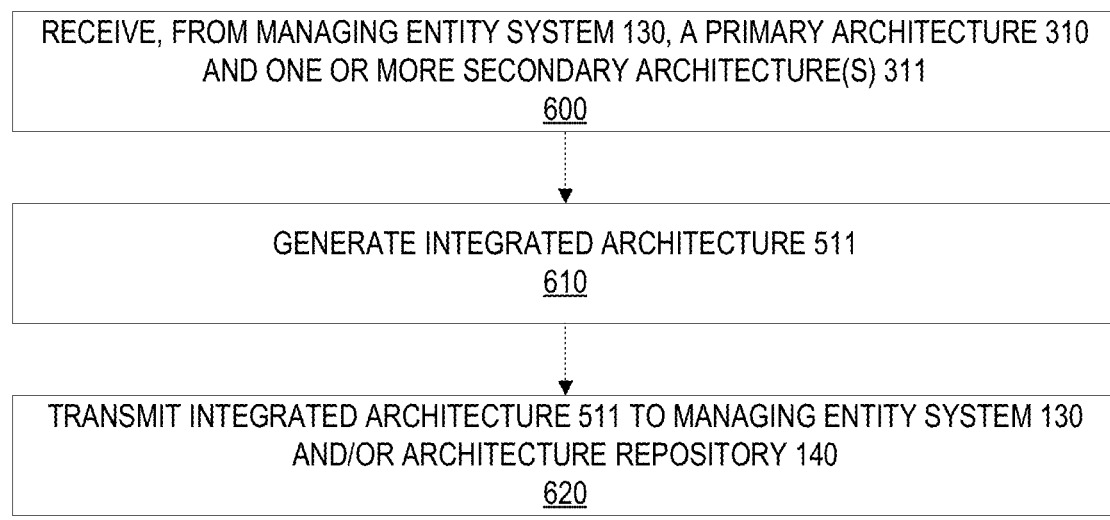
Figure 3:
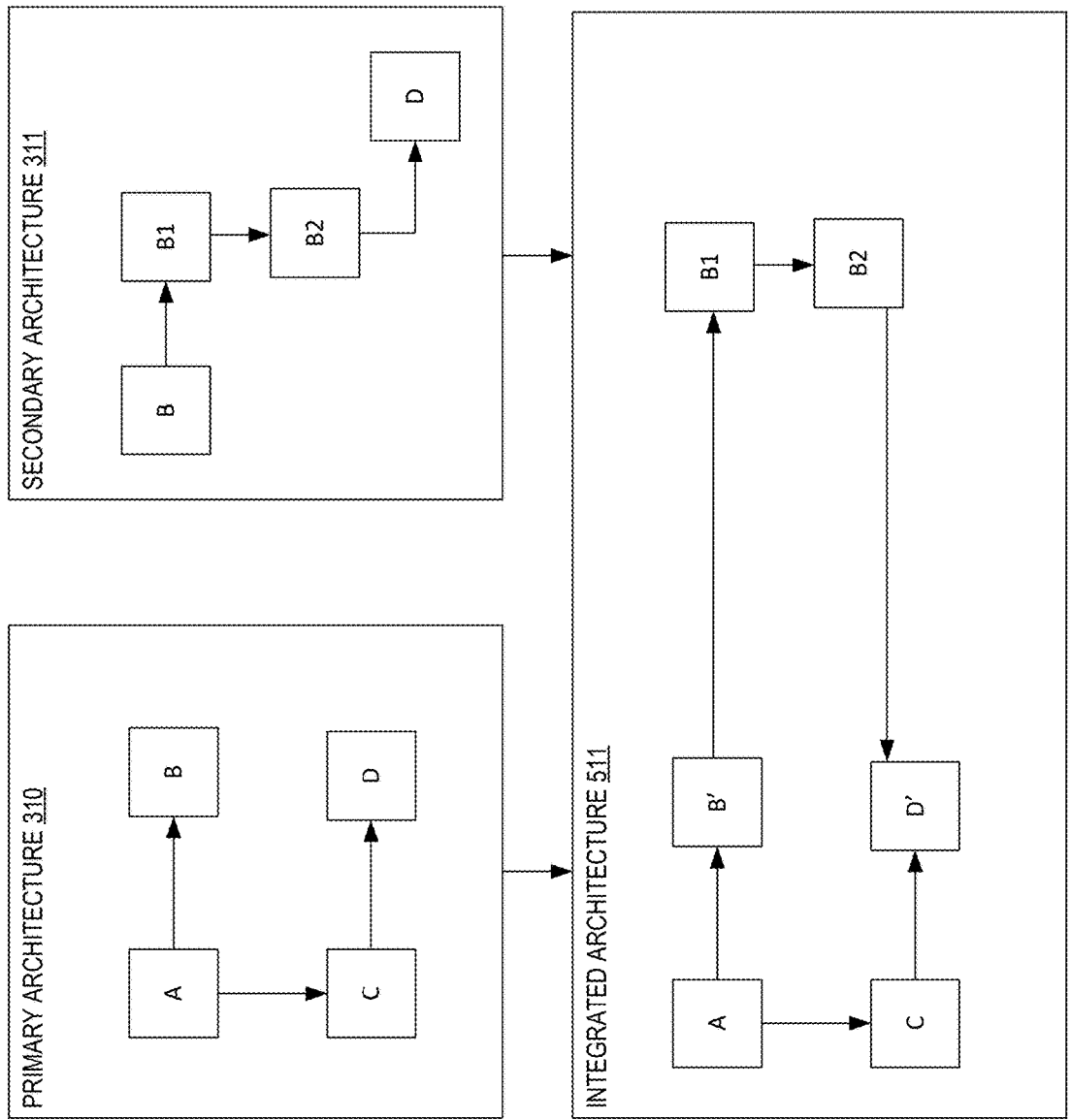
Figure 4:
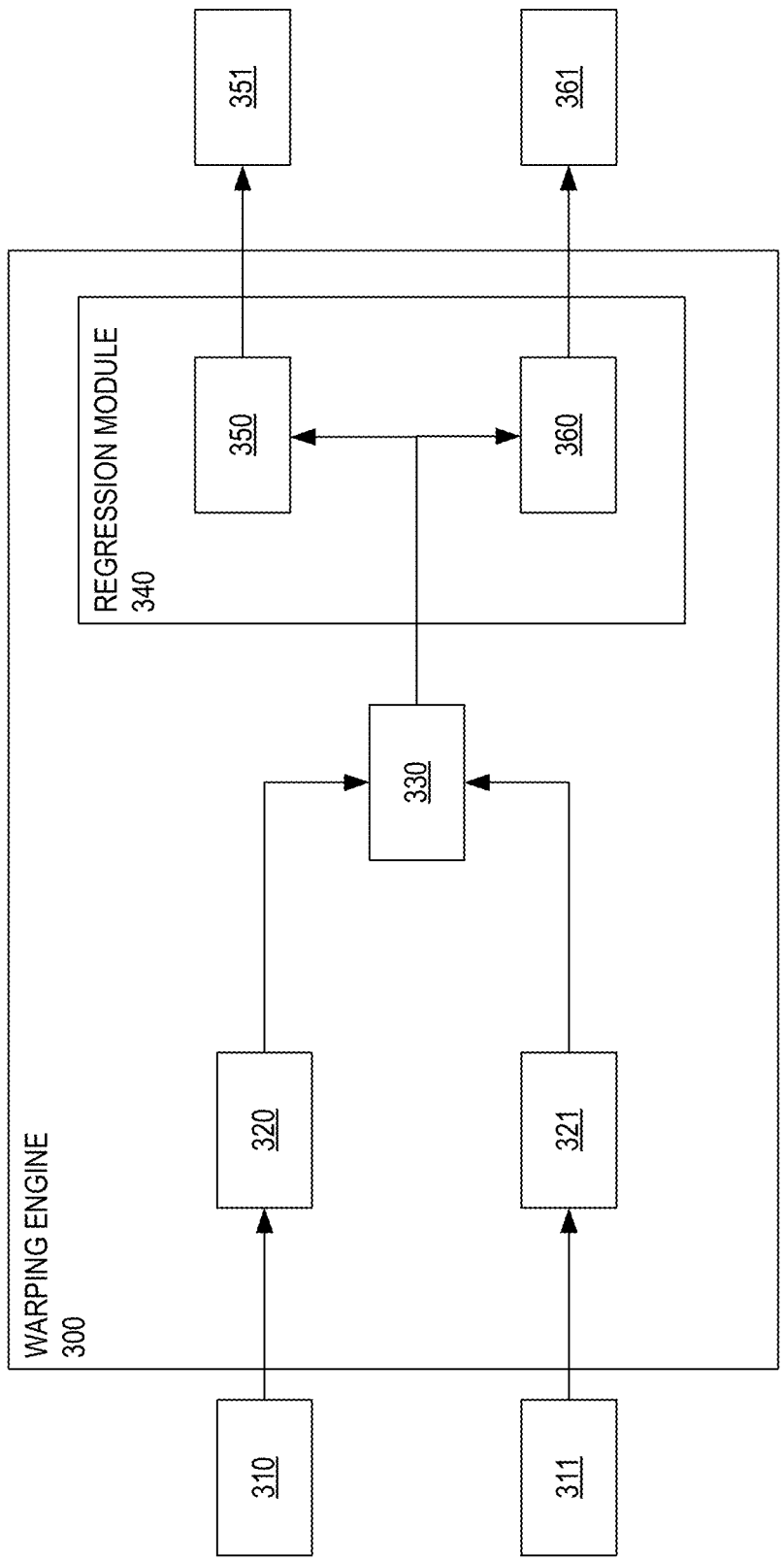
Figure 5:
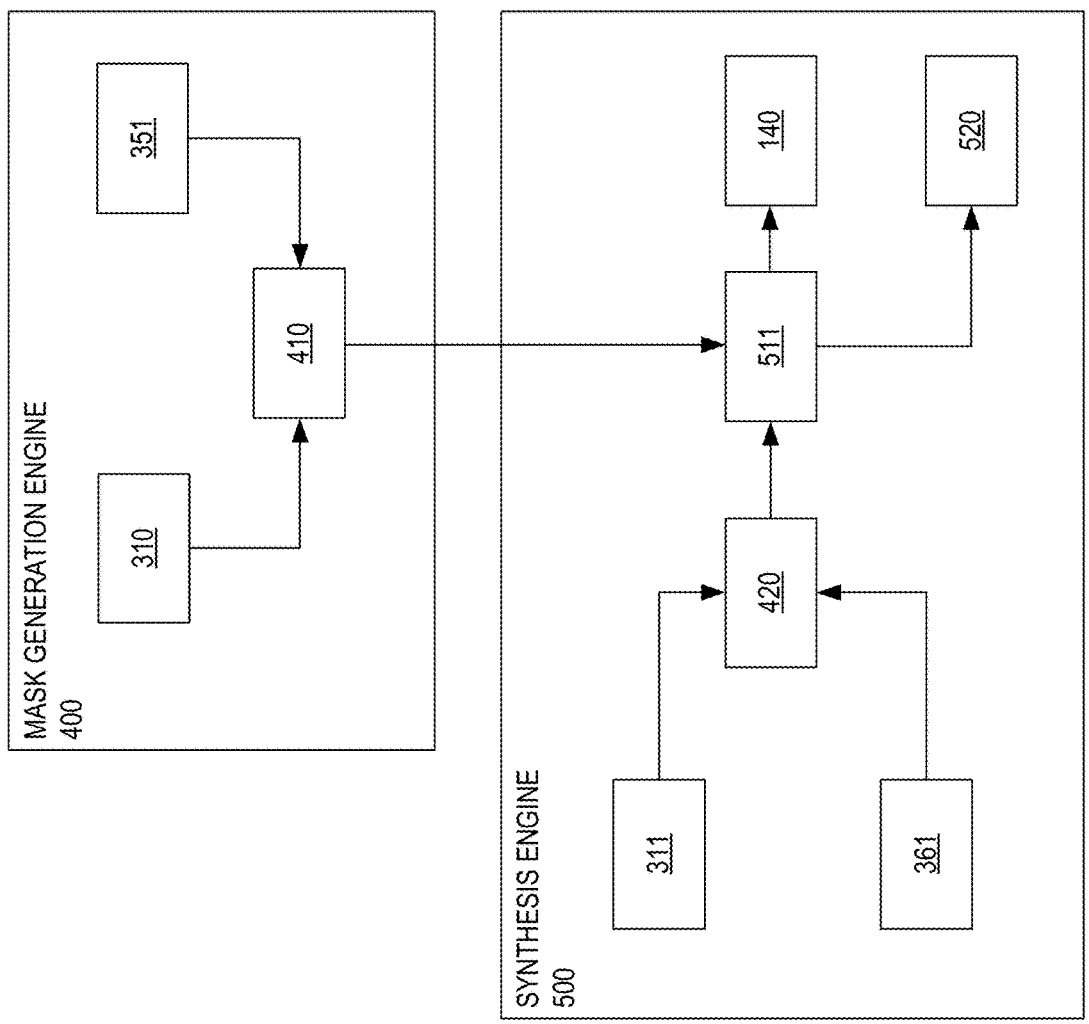

Having thus described embodiments of the invention in general terms, reference will now be made to the accompanying drawings, wherein:

FIG. 1 illustrates an operating environment for the technical architecture integration system, in accordance with one embodiment of the present disclosure;

FIG. 2 is a flow diagram illustrating a process using the technical architecture integration system, in accordance with one embodiment of the present disclosure;

FIG. 3 is a flow diagram illustrating another process using the technical architecture integration system, in accordance with one embodiment of the present disclosure;

FIG. 4 is a flow diagram illustrating another process using the technical architecture integration system, in accordance with one embodiment of the present disclosure; and FIG. 5 is a block diagram illustrating a primary architecture, a secondary architecture, and an integrated architecture associated with the technical architecture integration system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As used herein, an "entity" may be any institution utilizing large-scale computer systems, particularly computer systems which interact with multiple other systems. Typically, these systems can be related to an organizational function of the entity, its products or services, data maintenance, or any other aspect of the operations of the organization. As such, the entity may be any institution, group, association, financial institution, establishment, company, union, authority or the like, utilizing large-scale computer systems to perform a function.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

An "architecture diagram" or "diagram" as used herein may refer to any two-dimensional or three-dimensional representation of a computer system as well as any related components. An architecture diagram may depict relationships, constraints, and boundaries between components of an individual software program as well as the relationships between multiple software programs, hardware components, and users. Furthermore, an architectural diagram may be a functional depiction (i.e. identifying the functions of components in the system, the transactions executed by each component, decisions made by a user or software component, or the like), may be a structural depiction (i.e. identifying the operative connections between components, identifying the sub-components, modules, or engines contained within individual components, or the like), or may contain a combination of functional and structural information. A "touchpoint" as used herein may refer to any component, either functional or structural, which is used in multiple architecture diagrams or otherwise appears in more than one architecture diagram.

FIG. 1 illustrates an operating environment 100 for the technical architecture integration system, in accordance with one embodiment of the present disclosure. As illustrated, the operating environment 100 may comprise the technical architecture system 200 in operative communication with a managing entity system 130 and one or more architecture repositories 140. The operative communication may occur via a network 101 as depicted and may include other systems/devices not illustrated herein. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel. In this regard, the wireless communication channel may further comprise near field communication (NFC), communication via radio waves, communication through the internet, communication via electromagnetic waves and the like.

The managing entity system 130 may comprise a communication module and memory not illustrated and may be configured to establish operative communication channels with the technical architecture integration system 200 and/or the one or more architecture repositories 140 via a network 101. The one or more architecture repositories 140 may store completed integrated architecture diagrams and may be stored at one or more remote servers which are in operative communication with the managing entity system 130. In some embodiments, the one or more architecture repositories 140 are fully integrated within the memory of the managing entity system 130. In some embodiments, the managing entity system is in operative communication with the technical architecture integration system 200 via a private communication channel. The private communication channel may be via a network 101 or the technical architecture integration system 200 may be fully integrated within the managing entity system 130.

The technical architecture integration system 200 may include a communication device 210, a processing device 220, and a memory device 230 having a warping engine 300, a spline module 340, a mask generation engine 400, a synthesis engine 500, a processing system application 250 and a processing system datastore 260 stored therein. As shown, the processing device 220 is operatively connected to and is configured to control and cause the communication device 210 and the memory device 230 to perform one or more functions. In some embodiments, the warping engine 300, the spline module 340, the mask generation engine 400, the synthesis engine 500, and/or the processing system application 250 comprise computer readable instructions 240 that when executed by the processing device 220 cause the processing device 220 to perform one or more functions and/or transmit control instructions to the managing entity system 130, the one or more architecture repositories 400, and/or the communication device 210. It will be understood that the warping engine 300, the spline module 340, the mask generation engine 400, the synthesis engine 500, and/or the processing system application 250 may be executable to initiate, perform, complete, and/or facilitate one or more portions of any embodiments described and/or contemplated herein. The technical architecture integration system 200 may be owned by, operated by and/or affiliated with the same managing entity that owns or operates the managing entity system 130. In some embodiments, the technical architecture integration system 200 is fully integrated within the managing entity system 130.

The warping engine 300 may further comprise a regression module 340. The regression module 340 may store instructions and/or data that may cause or enable the warping engine 300 of the technical architecture integration system 200 to perform data interpolation and analysis of architecture diagrams received by the managing entity system 130 and/or architecture repositories 140. The warping engine 300 may also store instructions and/or data that may cause or enable the technical architecture integration system 200 to receive and/or store architecture diagrams, as well as generate predicted warps of said architecture diagrams as is discussed in greater detail with respect to FIG. 4.

The mask generation engine 400 may store instructions and/or data that may cause or enable the technical architecture integration system 200 to receive and/or store architecture diagrams from the managing entity system 130 and/or architecture repositories 140, as well as predicted warps of said architecture diagrams from the warping engine 300. The mask generation engine 400 may also store instructions and/or data that may enable the technical architecture integration system 200 to perform data concatenation and/or analysis and generate, from the architecture diagrams and the predicted warps, a predicted mask as is discussed in greater detail with respect to FIG. 5. The synthesis engine 500 may store instructions and/or data that may cause or enable the technical architecture integration system 200 to perform data concatenation in order to generate an integrated architecture diagram as is discussed in greater detail with respect to FIG. 54.

As will be discussed in greater detail with respect to FIG. 4 and FIG. 5, the warping engine 300, regression module 340, mask generation engine 400, and/or synthesis engine 500 may receive data from a plurality of sources, including one another, and may process said data using one or more machine learning and/or prediction algorithms. Various machine learning and/or prediction algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning and/or prediction algorithms may be used without departing from the invention.

The communication device 210 may generally include a modem, server, transceiver, and/or other devices for communicating with other devices on the network 101. The communication device 210 may be a communication interface having one or more communication devices configured to communicate with one or more other devices on the network 101, such as the managing entity system 130, the one or more architecture repositories 140, and/or other processing systems, data systems, and the like.

Additionally, referring to the technical architecture integration system 200 illustrated in FIG. 1, the processing device 220 may generally refer to a device or combination of devices having circuitry used for implementing the communication and/or logic functions of the data obfuscation system 200. For example, the processing device 220 may include a control unit, a digital signal processor device, a microprocessor device, and various analog-to-digital converters, digital-to-analog converters, and other support circuits and/or combinations of the foregoing. Control and signal processing functions of the data obfuscation system 200 may be allocated between these processing devices according to their respective capabilities. The processing device 220 may further include functionality to operate one or more software programs based on computer-executable program code 240 thereof, which may be stored in a memory device 230, such as the processing system application 250, the warping engine 300, the mask generation engine 400, and/or the synthesis engine 500. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 220 may be configured to use the network communication interface of the communication device 210 to transmit and/or receive data and/or commands to and/or from the other devices/systems connected to the network 101.

The memory device 250 within the technical architecture integration system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 2 is a high-level process flow diagram illustrating a process using the technical architecture system 200, in accordance with some embodiments. The process may begin at block 600, wherein the technical architecture system 200 receives, from the managing entity system 130, a data transmission comprising a primary architecture diagram 310 and at least one secondary architecture diagram 311, wherein the diagrams 310 and 311 are in any file format capable of being parsed in pixels, such as BMP, SVG, GIF, JPG, PNG, or the like. Both the primary architecture 310 and the at least one secondary architecture 311 may comprise a plurality of nodes (i.e. components) and edges (i.e. relationships between components). Each of the at least one secondary architecture(s) 311 may contain at least one node that exists in both the secondary architecture 311 and primary architecture 310. The primary architecture 310 and/or any one of the secondary architectures 311 may be initially accessed by the managing entity system 130 via the one or more architecture repositories 140, such that any one of the primary architecture 310 or secondary architecture(s) 311 may also be an integrated architecture 511. The process may then continue to block 610, wherein the technical architecture integration system 200 generates, via a combination of the warping engine 300, mask generation engine 400, and/or synthesis engine 500, an integrated architecture 511. The integrated architecture 511 may be in the same file format as the original primary architecture 310 and may contain the plurality of nodes and edges from both the primary architecture 310 and each of the secondary architecture(s) 311. The process is complete in block 630, wherein the technical architecture integration system 200 transmits the completed integrated architecture 511 to the managing entity system 130. The technical architecture integration system 200 may also store the integrated architecture 511 in the one or more architecture repositories 140.

FIG. 3 is a block diagram illustrating an exemplary primary architecture 310, an exemplary secondary architecture 311, and an exemplary integrated architecture 511 in greater detail. The primary architecture 310 comprises nodes A, B, C, and D connected by a plurality of edges. The secondary architecture 311 comprises nodes B, B1, B2, and D connected by a plurality of edges. The technical architecture integration system 200 may identify and merge nodes which are common to both the primary and secondary architectures and output an integrated architecture 511. The integrated architecture 511 comprises original nodes A, B1, B2, and C from the primary and secondary architectures, as well as merged nodes B' and D'. The integrated architecture 511 also maintains each of the edges from both the primary and secondary architectures. As discussed in greater detail with respect to FIG. 2, multiple secondary architectures may be integrated with a single primary architecture, and an integrated architecture may also be used as a primary or secondary architecture in subsequent integrations. An integrated architecture may be generated using a plurality of image-processing techniques and algorithms as is discussed further with respect to FIG. 4 and FIG. 5.

FIG. 4 is a high-level process flow diagram illustrating the warping engine 300 of the technical architecture integration system 200, in accordance with some embodiments. The warping engine 300 may receive, from the managing entity system 130, a primary architecture diagram 310 and one or more secondary architecture diagrams 311 to be integrated with the primary architecture diagram 310. The warping engine 300 may then, using one or more image processing techniques, determine a set of primary nodes 320 from the primary architecture diagram 310 and determine a set of secondary nodes 321 from the secondary architecture diagram 311. Next, the warping engine 300 may perform an image feature mapping routine or algorithm to both the primary nodes 320 and secondary nodes 321 and determine a set of predicted touchpoints 330, wherein each predicted touchpoint is a node existing in both the primary node set 320 and secondary node set 321.

The process illustrated in FIG. 4 continues when the regression module 340 of the warping engine 300 applies a regression spline algorithm to the set of predicted touchpoints 330. A plurality of algorithms or regression techniques may be used, such as polyharmonic splines (including thin-plate splines (TPS) and natural cubic splines), smoothing splines, elastic maps, radial basis functions, inverse distance weighting, subdivision surface schemes, or the like. The regression module 340 may output a set of normalized primary coordinate pairs 350 and a set of normalized secondary coordinate pairs 360. The normalized primary coordinate pairs 350 may correspond to the locations of each of the predicted touchpoints 330 in the primary architecture 310 and may be represented as a pair of Cartesian coordinate values, with each value ranging between 0 and 1. Similarly, the normalized primary coordinate pairs 360 may correspond to the locations of each of the predicted touchpoints 330 in the secondary architecture 311 and may also be represented as a pair of values, with each value ranging between 0 and 1.

The process may then continue when the regression module 340 applies a transformation algorithm to each of the sets of normalized primary and secondary coordinate pairs 350 and 360. The transformation algorithm may convert the normalized primary coordinate values to actual primary coordinate values corresponding to actual locations on the primary architecture 310. The full set of coordinate pairs for each of the predicted touchpoints in the primary architecture may be referred to as a predicted warp 351. The transformation algorithm may also convert the normalized secondary coordinate values to actual secondary coordinate values corresponding to actual locations on the secondary architecture 311. The full set of coordinate pairs for each of the predicted touchpoints in the secondary architecture may be referred to as a predicted warp mask 361.

FIG. 5 is a high-level process flow diagram illustrating another process using the technical architecture integration system 200, in accordance with some embodiments. In some embodiments, the mask generator module 400 of the system 200 receives, from the warping engine 300, the primary architecture 310 and predicted warp 351. Using the set of coordinate values contained in the predicted warp 351, the mask generator module 400 may apply an image processing algorithm to the primary architecture 310 to extract only the nodes or components which are located at each of the coordinate pairs. The extracted nodes may be referred to as the predicted mask 410.

In some embodiments of the system, mask generator module 400 also receives, from the warping engine 300, the predicted warp mask 361 and the secondary architecture 311. The mask generator module 400 may then use the coordinates contained in the predicted warp mask 361 to locate a set of nodes or components in the secondary architecture 311. The module 400 may then analyze the extracted nodes from the primary architecture and the located nodes from the secondary architecture to determine which nodes will be integrated together, referred to as a connection layer 420. This may be accomplished by evaluating the similarity between each of the nodes from the primary architecture and each of the nodes from the secondary architecture, using their geometrical shapes and/or functional meaning in the architecture to calculate a fitment score for each pair. In some embodiments, pairs of nodes with a fitment score above a predetermined threshold value will be integrated together. Additionally or alternatively, each of the nodes of the secondary architecture may be integrated with the node of the primary architecture with which it shares the highest fitment score.

The process may then continue to the synthesis engine 500, which receives, from the mask generation engine 400, the predicted mask 410 and the connection layer 420. The synthesis engine may then apply one or more image-processing algorithms to the predicted mask 410 and the connection layer 420, concatenating the two datasets and generating an integrated architecture 511. The synthesis engine 500 may also integrate random noise into the concatenation algorithm in order to correct for any margin of error occurring during any of the image-processing steps performed by the warping engine 300 or mask generation engine 400. The integrated architecture 511 is described in greater detail with respect to FIG. 3. In some embodiments, the synthesis engine 500 may transmit the integrated architecture 511 to the architecture repository 140 for storage and/or the managing entity system 130 for use.

In some embodiments, the synthesis engine 500 also comprises an evaluation module 520, which may evaluate the integrated architecture 511 for discrepancies between the primary and secondary architectures 310 and 311, as well as the predicted mask 410 and the connection layer 420. The evaluation module 520 may also collect and/or calculate information on the overall efficiency of the system 200, including an evaluation of the correctness of the integrated architecture 511, the computing time of each process step, and the like. In some embodiments, the evaluation module 520 may transmit said information to the managing entity system 130 for use in future improvements and adjustments to the system 200.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for technical architecture integration, the system comprising:
   at least one non-transitory storage device; and at least one processing device coupled to the at least one non-transitory storage device, wherein the at least one processing device is configured to:
  receive, from a managing entity system, a primary architecture diagram and at least one secondary architecture diagram;
  identify a set of primary nodes from the primary architecture diagram and a set of secondary nodes from each of the at least one secondary architecture diagrams;
  determine, based on an image feature mapping routine, a set of touchpoints, wherein each touchpoint is a node occurring in both the set of primary nodes and the set of secondary nodes;
  determine, based on a regression algorithm, a first location of each touchpoint in the primary architecture diagram, wherein each first location is represented by a coordinate pair;
  determine, based on a regression algorithm, a second location of each touchpoint in the at least one secondary architecture diagram, wherein each second location is represented by a coordinate pair;
  extract, at each of the first locations, a located primary node and extract, at each of the second locations, a located secondary node;
  calculate, for each of the located primary nodes, a level of similarity of the located primary node to each of the located secondary nodes;
  determine, for each of the located primary nodes, a matching node, wherein each of the matching nodes is the located secondary node with which the located primary node has the highest level of similarity;
  merge, based on a concatenation algorithm, each of the located primary nodes with each of the matching nodes, wherein a level of random noise is introduced into the concatenation algorithm; and
  generate an integrated architecture diagram, wherein the integrated architecture diagram comprises the set of touchpoints, the set of primary nodes which are not touchpoints, and the set of secondary nodes which are not touchpoints.

2. The system of claim 1, wherein calculating, for each of the located primary nodes, a level of similarity further comprises evaluating a geometrical shape and a functional meaning for the located primary node and each of the located secondary nodes.

3. The system of claim 1, wherein the at least one processing device is further configured to:
  calculate an overall efficiency score of the system; and
  transmit the overall efficiency score to the managing entity system.

4. The system of claim 1, wherein the at least one processing device is further configured to: transmit the integrated architecture diagram to the managing entity system; and
  store the integrated architecture diagram in a remote database.

5. A computer program product for technical architecture integration, the computer program product comprising at least one non-transitory computer-readable medium having computer-readable program code portions embodied therein, the computer-readable program code portions comprising:
  an executable portion configured to receive, from a managing entity system, a primary architecture diagram and at least one secondary architecture diagram;
  an executable portion configured to identify a set of primary nodes from the primary architecture diagram and a set of secondary nodes from each of the at least one secondary architecture diagrams;
  an executable portion configured to determine, based on an image feature mapping routine, a set of touchpoints, wherein each touchpoint is a node occurring in both the set of primary nodes and the set of secondary nodes;
  an executable portion configured to determine, based on a regression algorithm, a first location of each touchpoint in the primary architecture diagram, wherein each first location is represented by a coordinate pair;
  an executable portion configured to determine, based on a regression algorithm, a second location of each touchpoint in the at least one secondary architecture diagram, wherein each second location is represented by a coordinate pair;
  an executable portion configured to extract, at each of the first locations, a located primary node and extract, at each of the second locations, a located secondary node;
  an executable portion configured to calculate, for each of the located primary nodes, a level of similarity of the located primary node to each of the located secondary nodes;
  an executable portion configured to determine, for each of the located primary nodes, a matching node, wherein each of the matching nodes is the located secondary node with which the located primary node has the highest level of similarity;
  an executable portion configured to merge, based on a concatenation algorithm, each of the located primary nodes with each of the matching nodes, wherein a level of random noise is introduced into the concatenation algorithm; and
  an executable portion configured to generate an integrated architecture diagram, wherein the integrated architecture diagram comprises the set of touchpoints, the set of primary nodes which are not touchpoints, and the set of secondary nodes which are not touchpoints.

6. The computer program product of claim 5, wherein calculating, for each of the located primary nodes, a level of similarity further comprises evaluating a geometrical shape and a functional meaning for the located primary node and each of the located secondary nodes.

7. The computer program product of claim 5, further comprising:
  an executable portion configured to calculate an overall efficiency score of the system; and
  an executable portion configured to transmit the overall efficiency score to the managing entity system.

8. The computer program product of claim 5, further comprising:
  an executable portion configured to transmit the integrated architecture diagram to the managing entity system; and
  an executable portion configured to store the integrated architecture diagram in a remote database.

9. A computer-implemented method for technical architecture integration, the method comprising:
  receiving, from a managing entity system, a primary architecture diagram and at least one secondary architecture diagram;
  identifying a set of primary nodes from the primary architecture diagram and a set of secondary nodes from each of the at least one secondary architecture diagrams;

determining, based on an image feature mapping routine, a set of touchpoints, wherein each touchpoint is a node occurring in both the set of primary nodes and the set of secondary nodes;

determining, based on a regression algorithm, a first location of each touchpoint in the primary architecture diagram, wherein each first location is represented by a coordinate pair;

determining, based on a regression algorithm, a second location of each touchpoint in the at least one secondary architecture diagram, wherein each second location is represented by a coordinate pair;

extracting, at each of the first locations, a located primary node and extract, at each of the second locations, a located secondary node;

calculating, for each of the located primary nodes, a level of similarity of the located primary node to each of the located secondary nodes;

determining, for each of the located primary nodes, a matching node, wherein each of the matching nodes is the located secondary node with which the located primary node has the highest level of similarity;

merging, based on a concatenation algorithm, each of the located primary nodes with each of the matching nodes, wherein a level of random noise is introduced into the concatenation algorithm; and generating an integrated architecture diagram, wherein the integrated architecture diagram comprises the set of touchpoints, the set of primary nodes which are not touchpoints, and the set of secondary nodes which are not touchpoints.

\* \* \* \* \*